United States Patent [19]

Haven

[11] Patent Number: 5,040,879
[45] Date of Patent: Aug. 20, 1991

[54] VARIABLE DENSITY OPTICAL FILTER

[75] Inventor: Duane A. Haven, Cupertino, Calif.

[73] Assignee: Greyhawk Systems, Inc., Milpitas, Calif.

[21] Appl. No.: 591,664

[22] Filed: Sep. 28, 1990

Related U.S. Application Data

[63] Continuation of Ser. No. 318,670, Mar. 3, 1989, abandoned.

[51] Int. Cl.$^5$ ................................. G02F 1/13
[52] U.S. Cl. ........................................ 359/44; 359/45; 359/84; 359/91; 359/99
[58] Field of Search ............ 350/349, 351, 340, 350 S, 350/331 R, 331 T; 340/786

[56] References Cited

U.S. PATENT DOCUMENTS

| | | | |
|---|---|---|---|
| 3,796,999 | 3/1974 | Kahn | 350/351 X |
| 4,031,529 | 6/1977 | Borel et al. | 350/351 X |
| 4,240,712 | 12/1980 | Thirant | 350/351 |
| 4,477,151 | 10/1984 | Mash | 350/351 |
| 4,500,878 | 2/1985 | Hareng et al. | 340/786 X |
| 4,595,260 | 6/1986 | Kubota | 350/351 |
| 4,675,699 | 6/1987 | Kan et al. | 350/351 X |
| 4,701,029 | 10/1987 | Crossland et al. | 350/351 |
| 4,702,558 | 10/1987 | Coles et al. | 350/351 X |
| 4,799,770 | 1/1989 | Kahn et al. | 350/351 X |

FOREIGN PATENT DOCUMENTS

| | | | |
|---|---|---|---|
| 0024483 | 3/1981 | European Pat. Off. | 350/331 T |
| 0039523 | 4/1981 | Japan | 350/331 T |

Primary Examiner—Stanley D. Miller
Assistant Examiner—Huy K. Mai
Attorney, Agent, or Firm—Flehr, Hohbach, Test, Albritton & Herbert

[57] ABSTRACT

A light scattering liquid crystal transducer in which the degree of light scattering is controlled by impressing an electric field across the cell during and immediately after the application of a high-energy short duration thermal pulse applied to the entire viewed region of the cell. This allows full gray scale to be achieved as a function of applied voltage.

13 Claims, 3 Drawing Sheets (DARKEN VOLTAGE)

(THERMAL PULSE)

(VARIABLE FIELD)

(OPTICAL RESPONCE)

VARIABLE DENSITY OPTICAL FILTER

This is a continuation of application Ser. No. 318,670 filed Mar. 3, 1989 now abandoned.

BACKGROUND OF THE INVENTION

1. Field of the Invention

The present invention relates to thermo optic cell image projection systems. More specifically, the present invention relates to applying a uniform variable electric field across the thermo optic cell to produce a uniform variable darkening of the thermo optic cell.

2. Summary of the Prior Art

Liquid crystal cells are useful in display, optical processing, printing and related image projection applications. In these applications they serve as light valves or light modulators which control the flow of light from a light source to a receiver or receiving surface. When suitable spatial electronic addressing means is incorporated in a liquid crystal light valve system, spatially varying patterns can be written on the liquid crystal layer. The liquid crystal cell then becomes a spatial light modulator. When suitable illumination optics, typically including a light source and optical condenser, and suitable projecting optics, typically including a projection lens with appropriate aperture, are included in a liquid crystal light valve system, the liquid crystal cell then becomes an electronic slide which determines and controls the image projected onto a display screen, photosensitive detector array or photosensitive writing medium for display, optical processing, and printing applications, respectively.

The spatial variations of the image on the liquid crystal cell virtually always correspond to differences in the molecular orientation (different textures) of the liquid crystal in different areal regions of the liquid crystal layer. The spatially varying differences in molecular orientation are converted into spatially varying light intensity variations by means of suitable polarizing optics or suitable apertures to selectively pass and block scattered or refracted light from these spatially different regions. The various possibilities have been reviewed in detail (see F. J. Kahn, "The Molecular Physics of Liquid Crystal Devices," Physics Today, May 1982).

In one mode of operation the entire image area of the liquid crystal cell is switched, typically by electrical or thermal means, into a texture with uniform order (or disorder) thereby providing a uniform image background. One or more spatially varying images with different textures are then superposed, by the spatial addressing means, onto the uniform image background in order to create an image on the liquid crystal cell, and hence on the receiving surface, with the desired spatial variations in intensity and contrast.

Referring to FIG. 1, cross sectional view of a typical prior art liquid crystal cell 10 is shown. The cell 10 is filled with liquid crystal 20. A suitable liquid crystal is smectic A liquid crystal. The crystal is contained on two sides by a first and second electrode 16 and 18. The electrodes 16 and 18 are substantially parallel plates made of transparent material. A suitable material for the electrodes is indium-tin-oxide. The electrodes 16 and 18 serve to allow application of an electric field in a direction essentially normal to the liquid crystal layer while allowing projection light to be transmitted through the liquid crystal layer. Adjacent the electrodes 16 and 18 are alignment layers 17 and 19 that serve as dielectric layers for electrical blocking and/or liquid crystal molecular alignment. The liquid crystal cell 10 is further comprised of a first and second plane of glass 12 and 14. Among other things, the glass permits the passage of light, supports the electrodes, and provides integrity to the liquid crystal cell.

In the image projection system context, liquid crystal cell image projection systems incorporate means for creating an image on a liquid crystal cell and then use the created images as a mask for projection exposure of photosensitive media for photolithographic processing such as fabrication of printed wiring boards. One of the initial steps in producing an image on a liquid crystal cell involves forming a uniform texture of scattering centers. Scattering centers refer to the characteristic of the liquid crystal material in the cell 10. Scattering centers scatter and depolarize light. Conversely, liquid crystal regions without scattering centers transmit light without deflecting it or depolarizing it. A uniform texture of scattering centers is a microscopic volume of liquid crystal cell 10 which scatters incident light.

The uniform texture of scattering centers is then "drawn" on by a laser beam to create an image. The laser beam forms an image in the uniform texture of scattering centers by creating non-scattering regions wherever it is impinged. The process of impinging laser light on the uniform texture of scattering centers to produce non-scattering centers is known in the art, (F. J. Kahn, "Locally Erasable Thermo-Optic Smectic Liquid Crystal Storage Displays," U.S. Pat. No. 3,796,999 issued Mar. 12, 1974).

Following creation of an image either by producing scattering centers within a non-scattering region, or by creating non-scattering regions within a uniformly darkened background, it is necessary to erase or refresh the liquid crystal cell in order to prepare it for generation of subsequent images.

The prior art contains two methods of rapidly producing large area uniform scattering textures by methods other than laser-scanning which is relatively slow. Both of these methods involve the use of electrical energy and as will be discussed below, are not capable of producing the uniform variable darkening required in high resolution applications. In the first method, an electrical current pulse through the electrode is used to generate heat in the liquid crystal, the electrode heating method. In the second method, an electrical current pulse through the liquid crystal is used to create a turbulent material flow in the liquid crystal, the current-turbulence method. In the first method (see File A-44550, allowed July 1, 1988) a signal from a voltage source 22 is applied across one of the electrodes. This method is illustrated in FIG. 1 where the voltage signal from the source 22 is applied across the electrode 18. In this embodiment, short electrical pulses are used to thermally induce a uniform texture of scattering centers over the substantially large surface area of the cell 10. The result, in an image projection system, is that the short electrical pulses result in a fast darkening of the receiving surface. The electrical current sent through the electrode 18 produces thermal energy which raises the temperature of the liquid crystal material 20. Also, because it is a short pulse, the energy does not have time to spread. This lack of spreading facilitates rapid cooling which is responsible for the creation of uniform scattering centers. Physically, the liquid crystal is heated to a temperature at which it is an isotropic state. It then cools rapidly, quenching in some of the disorder of the isotropic state and thereby produces a high density of scattering centers.

In an alternate embodiment of the prior art, the electrical pulses are applied across the liquid crystal 20. In this embodiment, following the work of Tani (C. Tani, Applied Physics Letters 19, 241-2, Oct. 1, 1973. "Novel Electro-Optical Storage Effect in a Certain Smectic Liquid Crystal"), a dc electric field applied across a thin layer of smectic A liquid crystal causes a current to flow in the liquid crystal. The current produces a turbulent flow of the liquid crystal analogous to the well-known dynamic scattering effect in nematic liquid crystals. This turbulence can produce a high density of optical scattering centers in smectic liquid crystal cells with appropriate conductivity and appropriate orienting layers on the substrates, and can also be produced by low frequency ac voltages as well a dc voltages. See for example, W. A. Crossland and S. Canter, "An Electrically Addressed Smectic Storage Device," SID '85 Digest, pp. 124-126 (1985) and W. A. Crossland, J. H. Morrissy, and B. Needham, "Method for Preparing and Operating a Smectic Liquid Crystal Display Cell Having Indefinite Storage Properties, U.S. Pat. No. 4,139,273 (Feb. 13, 1979).

There are two significant problems, however, with these two methods of creating and erasing uniform texture of scattering centers. Generally speaking, the first of these relates to producing images of high resolution. The second relates to degradation of the liquid crystal cell caused by electrical stresses.

Addressing the first problem, the generation of uniform texture of scattering centers produces a relatively constant magnitude of scattering. Basically, the liquid crystal material is heated to a high temperature by the electric pulse. As the cell cools the disorder created by the electrically induced thermal pulse is quenched into the cell. This level of disorder is responsible for uniform texture of scattering centers, but it produces a constant level of darkening. That constant level of darkening is too dark for high resolution application or too light for adequate contrast with the created image.

In high resolution applications it is desirable to have a lighter background, i.e., a background with less scattering effect. This allows for thinner lines to be drawn on the liquid crystal cell. Given the dark background of the electrically created cell, a thin line drawn across the screen is obscured by the closely and densely surrounding scattered centers. Thus, it is desirable to efficiently control the magnitude (or density) level of the cell in the darkening process.

Control of the level of darkening may be accomplished by reducing or increasing the amount of energy (electrical or optical) required to obtain the desired level of darkening. However, the scattering centers produced by any level of input energy have been shown (see F. J. Kahn et al, "A Paperless Plotter Display System Using a Laser Smectic Liquid-Crystal Light Valve," SID 87 Digest, pp. 254-257), to lie in a layer immediately adjacent to the surface where the conversion of optical or electrical energy into the terminal pulse takes place. The thickness of this layer is proportional to the level of input energy. That is, low energy produces a thin layer with few scattering centers (low optical density) and high energy produces a thick layer with many scattering centers (high optical density).

Since the generation of scattering centers is subject to many variables including the resistivity of electrodes, concentration of additives and dopants and local environmental variations, it is not practical to generate thin layers with the good uniformity of darkening required for fine lines and high resolution. The preferred operating mode would be to apply energy sufficient to allow darkening of the cell to an initial level considered to be a maximum required for any image. Then by imposing the electric field reduce the optical density as required to produce thin, high resolution lines with the highest possible contrast.

In the current-turbulence method, the liquid crystal typically must have conducting additives or dopants in it, in order to allow enough current flow to create the scattering center inducing turbulence. The passage of current through the liquid crystal, however, typically results in electrochemical processes which cause the devices to fail. Thus other dopants, such as redox dopants, must be added to the liquid crystal to counteract these electrochemical processes and extend lifetime.

Additionally, processes must be developed to distribute these dopants uniformly through the liquid crystal cell and special low resistance contacts or busbars (requiring expensive and yield reducing patterning steps in the fabrication process). Electrodes must be provided in order to minimize voltage drops that would result in nonuniform current distribution and undesirable heating. Thus, implementing either of these methods results in considerable additional expense in fabrication of the liquid crystal cells.

Finally, to erase the previously applied background darkening together with the overlaying image requires application of an electric field. Erasure of scattering centers by application of an electric field during slow cooling of the liquid crystal is well known in the art. However, this process is too slow for practical use. Erasure of scattering centers by scanning with a laser is described by Fredric J. Kahn, in U.S. Pat. No. 3,796,999 issued Mar. 12, 1974. This is a pointwise erasure process and is also slow.

Fast erasure of a darkened background together with the overlaying image is described in reference Fredric J. Kahn et al, "A Paperless Plotter Display System Using a Laser Smectic Liquid-Crystal Light Valve," SID 87 Digest, pp. 254-257. The technique uses very high electrical fields ranging from 10-15V/micrometer. This high field causes electrical and electro-chemical stress which reduces the life of the liquid crystal cell.

SUMMARY OF THE INVENTION

Accordingly, it is an object of the present invention to provide an image projection system capable of high resolution imaging.

It is another object of the present invention to provide an image projection system wherein the background level of scattering can be varied uniformly to promote higher resolution of imaged features.

It is still another object of the present invention to provide an image projection system wherein the amount of electric current passed through the thermo optic cell is greatly reduced, thereby significantly extending the life of the thermo optic cell.

The attainment of these and related objects may be achieved through use of the novel variable uniform density optical filter herein disclosed. A variable uniform density optical filter in accordance with this invention has a light scattering liquid crystal transducer in which the degree of light scattering is controlled by impressing an electric field across the cell during and immediately after the application of a high-energy short duration thermal pulse applied to the entire viewed region of the cell. This allows full gray scale or shade to be achieved as a function of applied voltage.

The attainment of the foregoing and related objects, advantages and features of the invention should be more readily apparent to those skilled in the art, after review of the following more detailed description of the invention, taken together with the drawings, in which:

DETAILED DESCRIPTION OF THE PREFERRED EMBODIMENT

Figure 1:
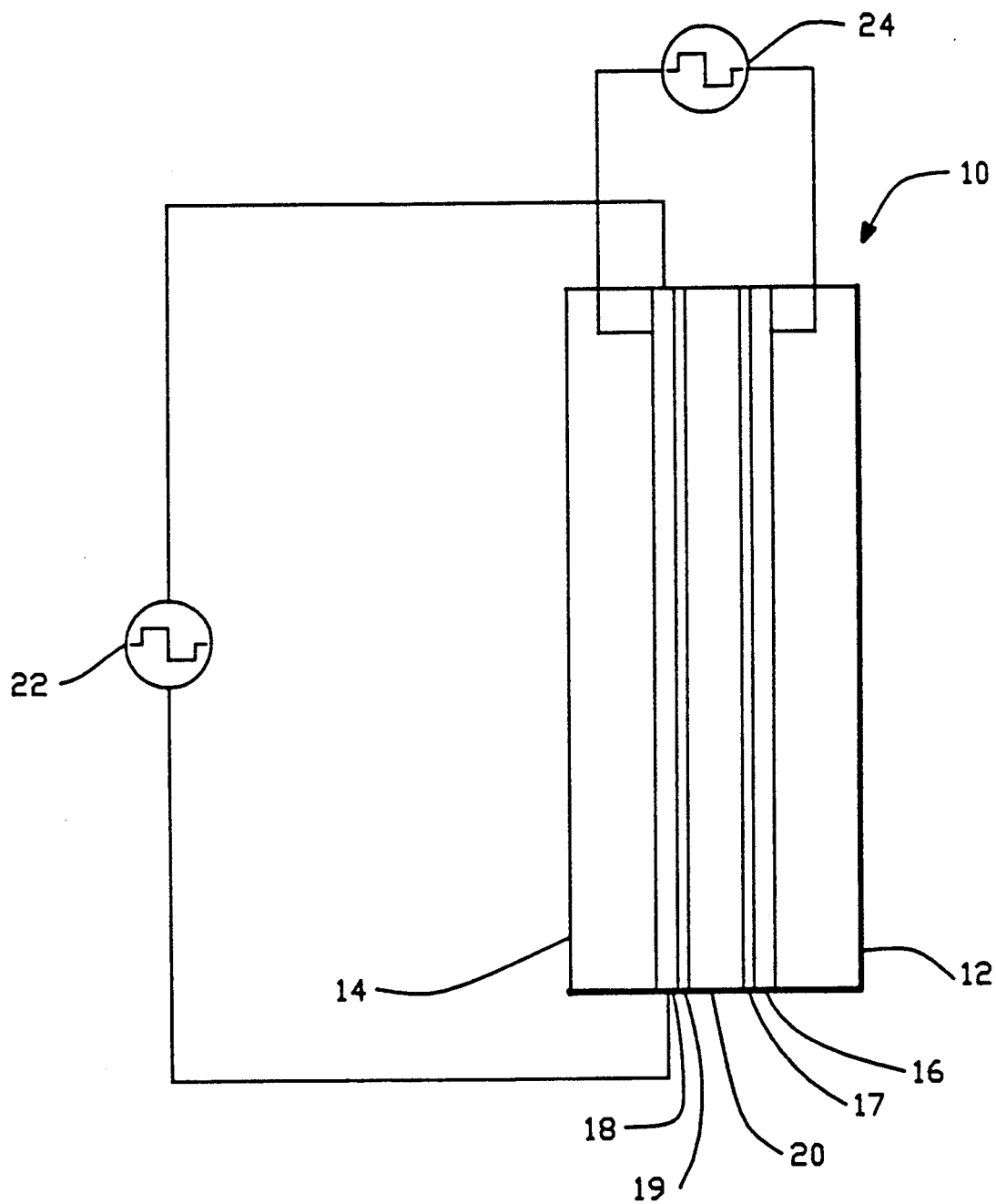
FIG. 1 illustrates alternative darkening embodiments of the prior art.

Referring to FIG. 2, a liquid crystal cell arrangement 40 is illustrated. The use of liquid crystal cells in projection systems is well known in the art, see pending U.S. Pat. No. 4,799,770, entitled "Liquid Crystal Cell for Image Projection and Method of Operating Same," by Frederic J. Kahn, issued Jan. 24, 1989. Liquid crystal cells fall within the class of thermo optic cells. Thermo optic cells are cells whose optical properties are effected by temperature. In general, a thermo optic cell can be used for the projection system of the preferred embodiment.

In the projection context light is either transmitted through or reflected off of the cell 42 on to an image receiving surface (not shown). The image impinged on the image receiving surface is created by the light that was either transmitted through or reflected off of the cell 42, respectively. The extent to which the individual crystal centers in the cell scatter light determines the overall transmission or reflection properties of a cell. The following text is addressed primarily toward transmissive liquid crystal cell, but could equally be applied to reflective cell.

Liquid crystal material is provided internal to the liquid crystal cell 42. In general, liquid crystal is a material that possesses properties of molecular ordering useful in the construction of light modulation devices. The anisotropic liquid crystal molecules will align to properly prepared surfaces and exhibit ordering within the bulk material. They will also align to applied electric fields. Material exhibiting positive dielectric anisotropy will align with the molecular axis parallel to the applied field.

A liquid crystal representative of the present invention will possess phases and degrees of ordering that are temperature dependant. That is, the smectic phase at lower temperature, will be more solid like than the nematic cholesteric phase at a higher temperature. In the isotropic phase, the material will essentially have no ordering in the bulk, but the molecules will still respond to an externally applied electric field.

When these described materials are cooled from the isotropic phase, the resultant smectic phase has two metastable configurations. If the material is cooled under conditions where a sufficiently high electric field is applied, the smectic phase will be homeotropically aligned and will transmit light without distortion. If no field is applied, and the material is rapidly cooled, a light scattering texture is formed. Upon this texture of scattered centers an image can then be created. This is usually done with a laser light, but alternative methods, known in the art, are available.

As stated in the previous section, however, prior art devices used to erase or modify the light scattering texture require substantially high electric fields in the order of 10–15 V/micrometer. This substantially high electric field greatly increases the risk of developing a short across the liquid crystal cell 42 and reduces the cell lifetime through electrochemical degradation. The present invention solves this problem by greatly reducing the amount of electric field which need be applied across the cell 42 to obtain desired scattering texture to the range of 1–5 V/micrometer. The present invention also greatly increases the resolution at which image created on the cell 42 (or "object" in the optic projection context) can be reproduced at the image receiving surface, as will be discussed below.

Figure 2A:
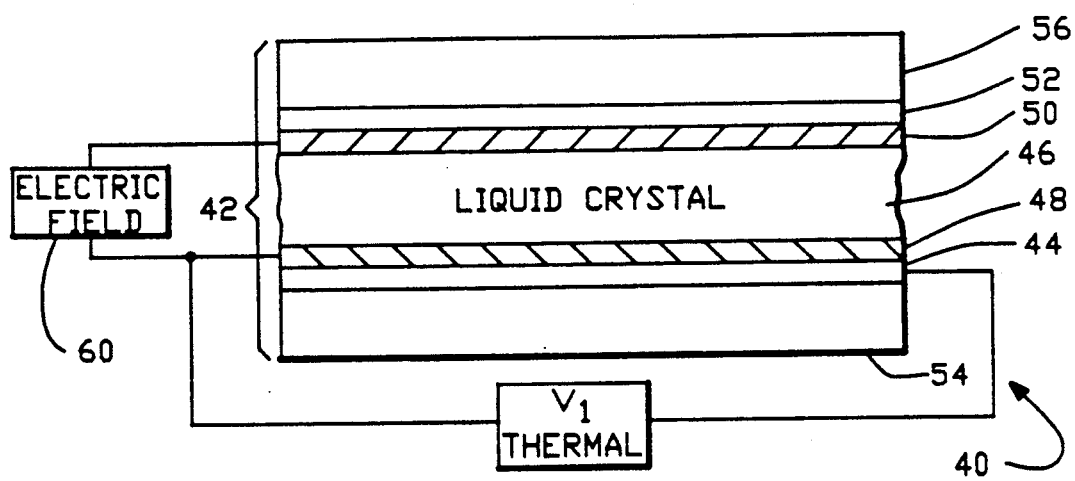
FIG. 2a–e is an illustration of the preferred embodiment.
Figure 2B:
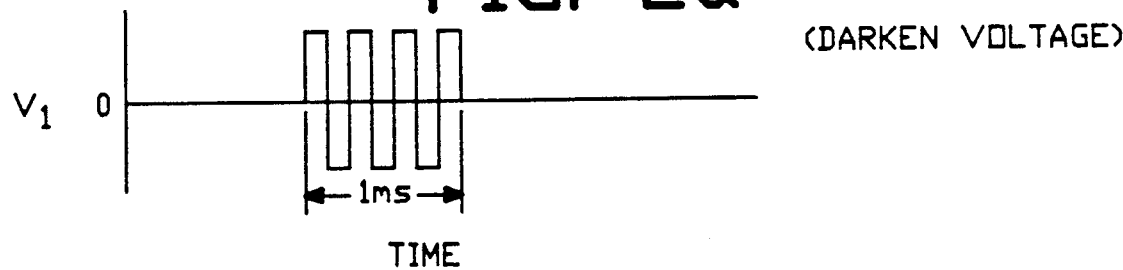
Figure 2C:
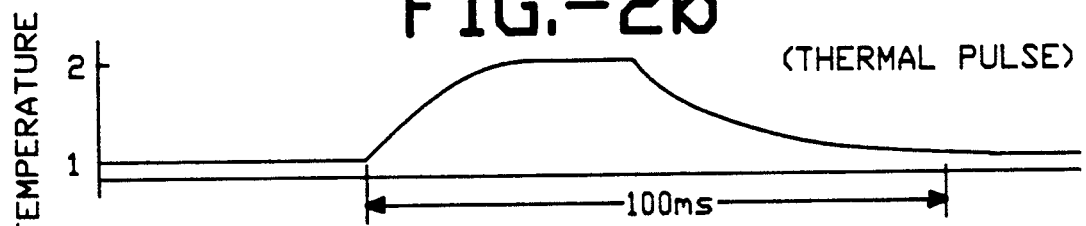

Voltage pulses $V_1$, FIG. 2b, is applied across the transparent conductor 44 of the cell 40. The pulse $V_1$ is of a sufficient magnitude to quickly heat the transparent conductor 44 and the adjacent liquid crystal 46 from a first temperature t1, to a second temperature t2, FIG. 2c. The rapid heating and cooling of the liquid crystal will form scattering centers in accord with the teachings of U.S. Pat. No. 4,799,770 issued to Frederic J. Kahn for a "Liquid Crystal Cell for Image Projection and Method of Operating Same".

Figure 2D:
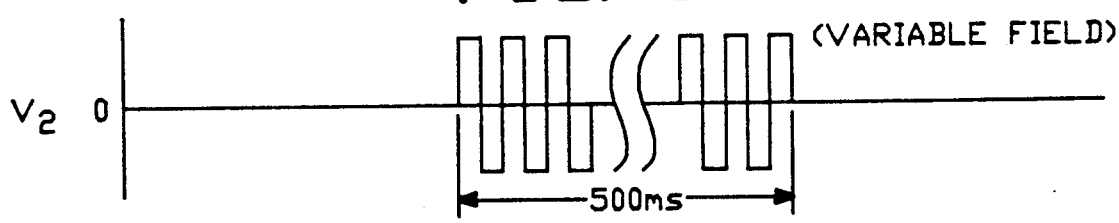

At the completion of the voltage pulse $V_1$, a second voltage pulse $V_2$, see FIG. 2d, is impressed across the cell using as electrodes, transparent conductors 52, 44. This voltage results in an electric field essentially normal to the plane of electrodes 52, 44. As earlier described, liquid crystal materials of positive dielectric anisotropy will tend to align parallel to this applied field but will be prevented from doing so until the second temperature, tz (of FIG. 2c) is reached or exceeded. The degree of ordering within the liquid crystal is directly proportional to the magnitude of the electric field.

Figure 2E:
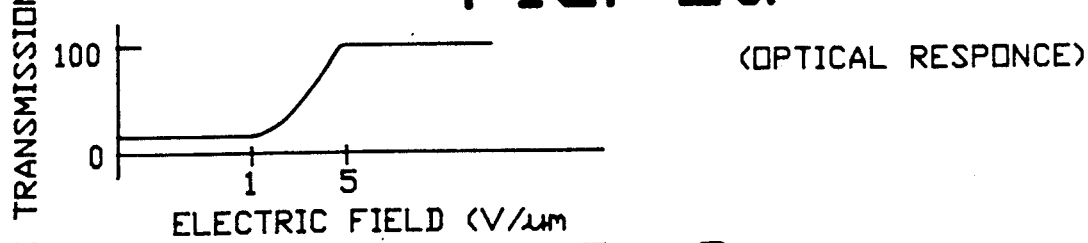

The field is maintained until the liquid crystal has cooled to the first temperature. This causes the level of light scattering as determined by the magnitude of the electric field to be maintained. Referring to FIG. 2e, a magnitude of electric field of 1V/micrometer will cause only small change in the level of light scattering obtained, resulting in a relatively dark background. A 5 volts/micrometer will induce no scattering to form as the liquid crystal cools to the first temperature. Intermediate levels of electric field strength will result in intermediate levels of light scattering.

The weaker the applied electric field the greater the darkening of the cell, or in other words, the greater the accumulation of a uniform texture of scattering centers. Conversely, the stronger the applied field the greater the degree of ordering of the liquid crystal resulting in a lighter texture of scattering centers. This ability to vary background intensity or, the texture of light scattering centers is crucial to producing high resolution images.

Essentially, when a fine feature, for instance 3/1000 inch, is written on a dark background, that background level generated by the prior art normal thermal pulse darkening methods, the feature is obscured by the pervading darkness of the background. Thus, drawing a circuit board connection of 3/1000 of an inch would produce a significant threat of the line not being drawn properly and a resulting open circuit arising in the circuit.

By being able to lighten the overall darkness of the background more precisely, minimum features can be drawn with more exacting detail. The range of electric field applied to the cell during cooling, to produce the desired lighter background is 1-5 V/micrometer. It may be applied during the thermal pulse and remain thereafter. The electric field serves to freeze a certain amount of disorder injected by the thermal pulse. The specific amount of the disorder frozen is determined by the magnitude of the electrical field.

Referring to FIG. 3a-e, another method of inducing the thermal pulse of the preferred embodiment is shown. The arrangement 62 is essentially the same as arrangement 40 except an optical source is used to generate the thermal pulse. The use of optical sources to provide thermal pulse darkening is discussed in more detail in pending U.S. Patent application, Ser. No. 318,669, entitled PULSE OPTICAL DARKENING, filed Mar. 3, 1989, by Frederic J. Kahn. An optical pulse can generate a sufficient thermal pulse on its own or dopants can be placed in the liquid crystal and/or surrounding material to facilitate thermal absorption and conversion.

Figure 3A:
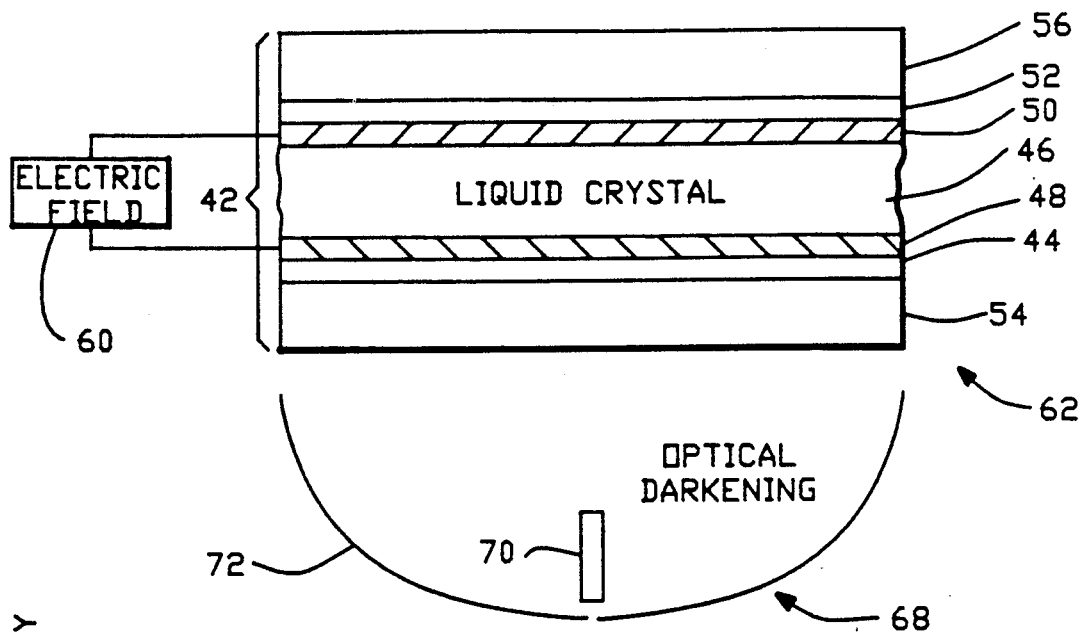
FIG. 3a–e is an illustration of the preferred embodiment.
Figure 3B:
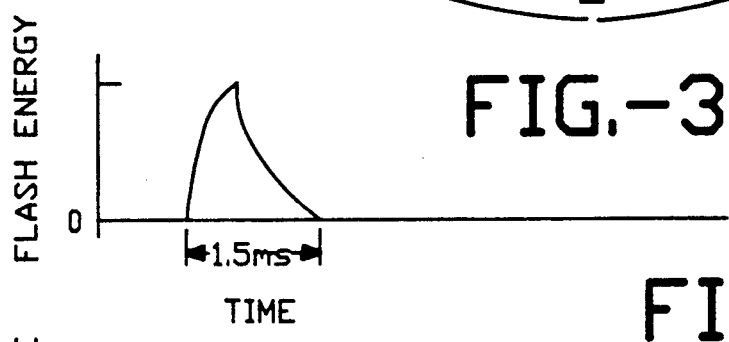
Figure 3C:
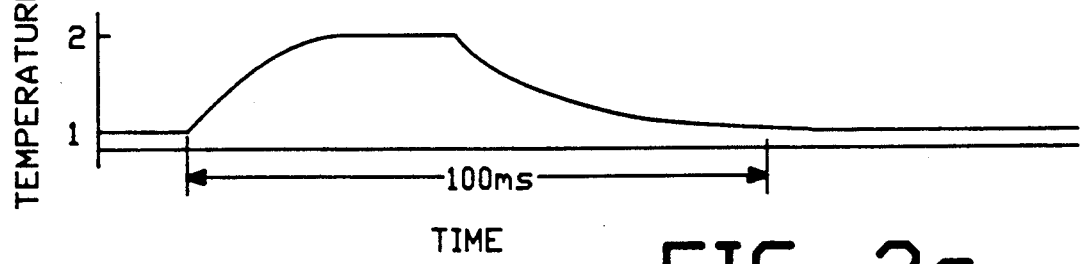
Figure 3D:
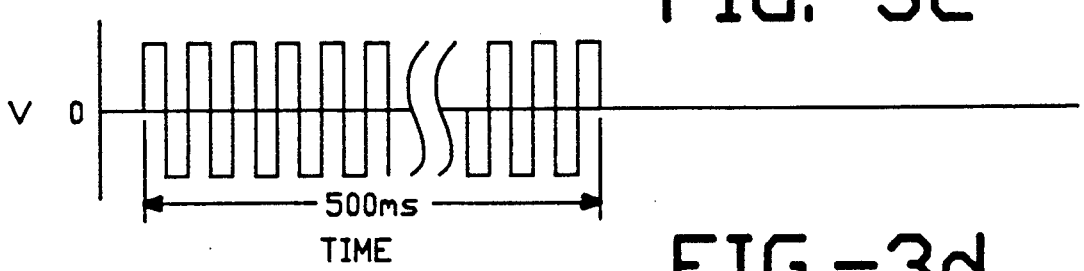
Figure 3E:
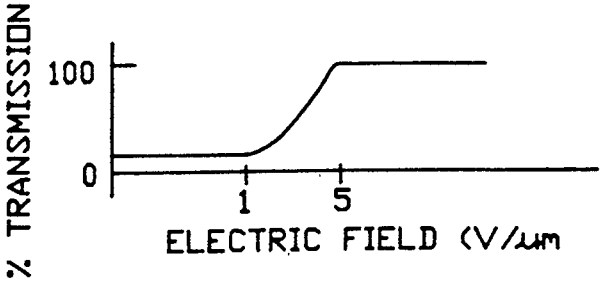

The transparent substrates 54 and 56 support and protect the inner layers of the cell 62 while unobstructively transmitting light. The light source 68, comprised of a flash tube 70 and reflective optics 72, impinges optical energy, FIG. 3b, upon the cell 42 which is converted to thermal energy heating the cell 42, FIG. 3c. As the cell 42 cools, an electric field, FIG. 3d, is applied to the cell 62 by the electrical source 60 through the electrodes 44 and 52 producing the above described results; those results being variable uniform background scattering. The percentage of transmission with respect to electric field strength is shown in FIG. 3e.

In summary, the present invention provides for a controlled optical density background field on which subsequent images may be written. The preferred writing method is with a laser beam.

It should also be apparent to those skilled in the art that various changes in form and details of the invention as shown and described may be made. It is intended that such changes be included within the spirit and scope of the claims appended hereto.

What is claimed is:

1. A thermo optic cell assembly, comprising:
   thermo optic cell means of the type containing a layer of liquid crystal material;
   interior and exterior cell walls, said layer of liquid crystal material located between said interior and exterior walls;
   first and second transparent electrode means located on opposite sides of said layer of liquid crystal material and generally parallel to and inside of said interior and exterior cell walls;
   means located in proximity to said thermo optic cell for providing heat to said layer of liquid crystal material in said thermo optic cell so that said layer of liquid crystal material is brought into an isotropic state and simultaneously maintained there;
   means for simultaneously and rapidly removing heat from said layer of liquid crystal material so that said layer undergoes a simultaneous and rapid cooling; and
   means connected to said transparent electrodes for simultaneously applying a uniform variable electric field of a sufficient magnitude and duration across said layer of liquid crystal material immediately after removal of said heat and while said layer of liquid crystal is simultaneously and rapidly cooling from said isotropic state to form a uniform variable background of scattering centers in said layer of liquid crystal material;
   wherein said assembly produces a uniform variable background of scattering centers which can vary in degree of uniform background darkness from a completely dark background of scattering centers to a clear background of scattering centers, including all degrees therebetween, based on said magnitude and duration of said simultaneously applied electric field during said simultaneous and rapid cooling of said layer of liquid crystal material from said isotropic state.

2. The assembly as in claim 1 wherein said liquid crystal material is heated by electrical means.

3. The assembly as in claim 1 wherein said liquid crystal material is heated by optical means.

4. The assembly as in claim 1 wherein said uniform variable electrical field is applied at a magnitude ranging from approximately 1-5 volts/micrometer and for a duration ranging from 50 to 5000 milliseconds.

5. A thermo optic cell assembly of the type including a layer of liquid crystal material bounded between transparent conductive electrodes, comprising:
   means located in close proximity to said thermo optic cell for providing heat to said layer of liquid crystal material so that said layer is heated to the isotropic state; and
   means for removing said heat rapidly and simultaneously so that said layer cools rapidly and simultaneously;
   means coupled to said transparent conductive electrodes for applying a variable, simultaneous, uniform electric field across an entire surface area of said layer of liquid crystal material while said layer of liquid crystal material rapidly and simultaneously cools from said isotropic state, said variable electric field being of a sufficiently variable magnitude and duration to produce a background of uniform scattering centers ranging from a completely clear background to a completely dark background and all levels therebetween.

6. The assembly as in claim 5 wherein said liquid crystal material is heated by applying electrical heating energy to one of said transparent conductive electrodes.

7. The assembly as in claim 5 wherein means are provided for applying optical energy to said liquid crystal material to heat the material.

8. A method of creating a uniform variable degree of scattering centers in a layer of liquid crystal material in a thermo optic cell, including the steps of:
   providing thermal energy to said layer of liquid crystal material so that said layer is brought into an isotropic state;
   maintaining all of said layer of said liquid crystal in said isotropic state for at least one simultaneous instant;
   rapidly and simultaneously removing said thermal energy from said layer of liquid crystal material so that said liquid crystal material cools rapidly and simultaneously from said isotropic state; and
   simultaneously applying a uniform variable electric field of a specific magnitude and duration across said layer of liquid crystal material precisely during a time period when said layer is rapidly and simultaneously cooling from said isotropic state to produce a variable degree of uniform scattering centers in said layer of liquid crystal material.

9. The method of claim 8 wherein said step simultaneously applying a uniform variable electric field further comprises the steps of:
applying said electric field for a duration ranging from 50 to 5000 milliseconds and at a magnitude ranging from 0.1 to 50 volts/millimeter.

10. The method as in claim 8 wherein the liquid crystal material is heated by electric heating.

11. The method as in claim 8 wherein the liquid crystal material is heated by optical means.

12. The method as in claim 8 when the electric field is applied simultaneously with the heating step, whereby the amount of electric field that is needed to modulate scattering is reduced thereby causing less stress to the cell and prolonging the life of the cell.

13. A thermo optic cell assembly, comprising:
thermo optic cell means of the type containing a layer of liquid crystal material;
interior and exterior cell walls, said layer of liquid crystal material located between said interior and exterior walls;
first and second transparent electrode means located on opposite sides of said layer of liquid crystal material and generally parallel to and inside of said interior and exterior cell walls;
means located in proximity to said thermo optic cell for providing heat to said layer of liquid crystal material in said thermo optic cell so that said layer of liquid crystal material is brought into an isotropic state and simultaneously maintained there;
means for simultaneously and rapidly removing heat from said layer of liquid crystal material so that said layer undergoes a simultaneous and rapid cooling; and
means connected to said transparent electrodes for simultaneously applying an electric field of a sufficient magnitude and duration across said layer of liquid crystal material immediately after removal of said heat and while said layer of liquid crystal is simultaneously and rapidly cooling from said isotropic state to form a uniform variable background of scattering centers in said layer of liquid crystal material;
wherein said assembly produces a uniform variable background of scattering centers which can vary in degree of uniform background darkness from a completely dark background of scattering centers to a clear background of scattering centers, including all degrees therebetween, based on said magnitude and duration of said simultaneously applied electric field during said simultaneous and rapid cooling of said layer of liquid crystal material from said isotropic state;
said electric field ranging from approximately 1 to 5 volts/micrometer and being applied for a period of time ranging from approximately 50 to 5000 milliseconds.

* * * * *